United States Patent
LaFlair

(12) 
(10) Patent No.: US 6,832,657 B1
(45) Date of Patent: Dec. 21, 2004

(54) AERATOR ATTACHMENT

(76) Inventor: Bryant B. LaFlair, 2506 Riverwoods Dr., N., Canton, MI (US) 48188

( * ) Notice: Subject to any disclaimer, the term of this patent is extended or adjusted under 35 U.S.C. 154(b) by 0 days.

(21) Appl. No.: 10/151,554

(22) Filed: May 21, 2002

(51) Int. Cl.[7] ............................................. A01B 45/02
(52) U.S. Cl. ........................ 172/21; 172/247; 172/540
(58) Field of Search ............................ 172/21, 22, 247, 172/518, 540, 548, 559, 118, 122, 123

(56) References Cited

U.S. PATENT DOCUMENTS

| | | | | |
|---|---|---|---|---|
| 3,570,604 A | | 3/1971 | Allard .......................... | 172/22 |
| 4,424,868 A | * | 1/1984 | Staniforth et al. ............ | 172/21 |
| 4,516,638 A | * | 5/1985 | Hicks et al. ................... | 172/22 |
| 4,910,948 A | * | 3/1990 | Nelson ......................... | 56/16.1 |
| 5,101,910 A | * | 4/1992 | Dawson ........................ | 172/27 |
| 5,353,724 A | * | 10/1994 | Wheeley, Jr. ................ | 111/128 |
| 5,398,768 A | | 3/1995 | Staples ......................... | 172/21 |
| 5,623,996 A | * | 4/1997 | Postema ...................... | 172/118 |
| 5,806,293 A | * | 9/1998 | Klein et al. ................... | 56/249 |
| 5,823,269 A | * | 10/1998 | Leclerc ......................... | 172/21 |
| 6,241,025 B1 | | 6/2001 | Myers et al. .................. | 172/21 |
| 6,415,872 B2 | * | 7/2002 | Myers et al. .................. | 172/21 |

* cited by examiner

*Primary Examiner*—Thomas B. Will
*Assistant Examiner*—Nathan Mammen
(74) *Attorney, Agent, or Firm*—Charles W. Chandler

(57) ABSTRACT

A lawn aerator is attached to the front of a self-propelled lawn mower.

10 Claims, 4 Drawing Sheets

AERATOR ATTACHMENT

BACKGROUND AND SUMMARY OF THE INVENTION

Zero-turn riding lawn mowers are popular because they can maneuver in very tight areas. Aerators are devices having soil-penetrating tines that, in some cases, are mounted on the front of mechanized lawn equipment. Usually the penetration depth of the aerator tines is determined by adding a weight on the aerator frame. However, as far as I know, no lightweight aerator attachment can be readily mounted on the front of certain zero-turn riding mowers in which the weight of the mower is used to apply down pressure on the aerator tines.

Prior art illustrating aerators mounted on the front of mechanized lawn equipment may be found in U.S. Pat. No. 3,570,604 issued Mar. 16, 1971 to Patrick Leo Allard et al. for "Soil Penetrating Implements"; U.S. Pat. No. 6,241,025 issued Jun. 5, 2001 to James W. Myers et al. for "Aerator"; U.S. Pat. No. 5,398,768 issued Mar. 21, 1995 to Clarke H. Staples for "Aerator" and U.S. Pat. No. 4,158,391 issued Jun. 19, 1979 to Boyd D. Clements for "Soil Aerating Device".

The broad purpose of the present invention is to provide a lightweight aerator attachment that can be mounted on a zero-turn lawn mower to apply the weight of the mower as a downward pressure on the aerator tines. One advantage of the preferred embodiment, which will be described in greater detail, permits a lightweight aerator attachment to be quickly attached to commercially available, zero-turn lawn mowers.

Another advantage is that the attachment permits the operator to adjust the penetration depth of the aerator tines into the ground by using the weight of the lawnmower.

Another object of the invention is to provide an aerator attachment having a linear actuator for raising and lowering the aerator drum, the actuator being entirely mounted on the aerator structure.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
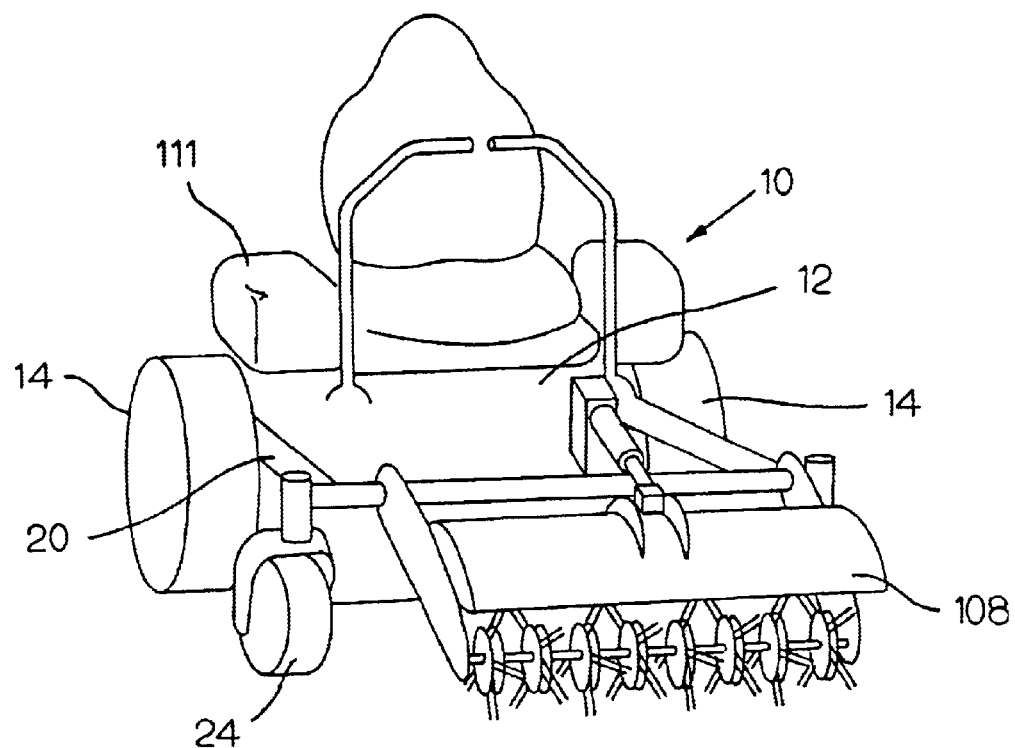
FIG. 1 is a view of a commercially available zero-turn lawn mower advancing a preferred aerator attachment.

FIG. 1 illustrates a commercially available zero-turn lawn mower 10, marketed by Textron as the Bunton BZT 2000 series 10 model. This vehicle has a body (frame) 12, a pair of rear large drive wheels 14 and an engine, not shown, for driving wheels 14.

The mower has front arms 20 and 22 supported on a pair of caster wheels 24 and 26. The mower has a substantial weight resting on the drive wheels and the caster wheels.

Referring to FIGS. 1–4, aerator attachment 30 weighs about 110 pounds and is connected by a hitching structure 32 to arms 20 and 22 of the lawn mower. Hitching structure 32 comprises a lateral, tubular-shaped support 34. A pair of channel-shaped, parallel, spaced support members 36 and 38 is welded to support 34.

Short, channel-shaped supports 40 and 42 are telescopically slidably mounted on the opposite ends of support 34 to form a lateral adjustable extension of support 34. Gripping means 44 and 46 are mounted on the outer ends of support 42. Gripping means 44 comprises a channel-shaped member 48 and a plate 50 configured to cooperate with member 48 and fastener means 52 to tightly damp mower arm 22 between them. This arrangement forms a rigid connection between support 34 and mower arm 22. A pivot member 54 connects the outer end of support 42 to gripping means 44 to accommodate the angle of mower arm 22 with respect to the longitudinal axis of the lawn mower.

Similarly, gripping means 46 comprises a channel-shaped member 56 attached by fastener means 58 to a plate 60 to clamp mower arm 20 between them. A pivot member 62 connects channel 56 to the outer end of support 40. Gripping means 46 is disposed at an angle to accommodate the angle of mower arm 20 with respect to the longitudinal axis of the lawn mower. When the two gripping means are disposed in a desired position on support 34, then fastener means 64 and 65 are located in slots 64a and 65a to attach arms 42 and 44 to the outer ends of lateral support 34.

Other hitching structures can be employed for fixedly attaching the aerator attachment to other types of mowers, for example, directly to the mower frame.

Figure 2:
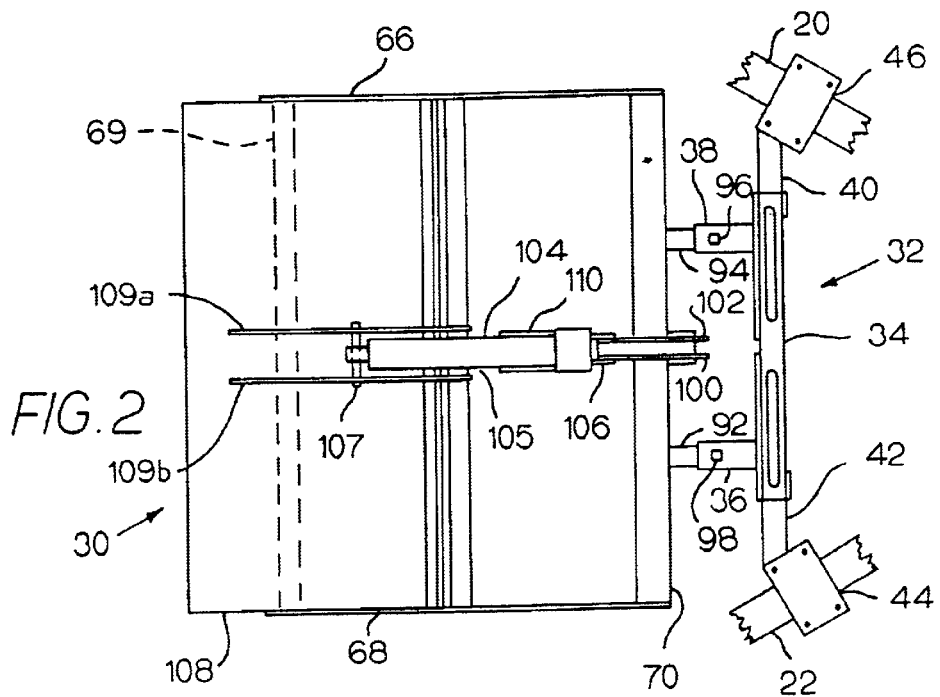
FIG. 2 is a plan view of the aerator attachment.
Figure 3:
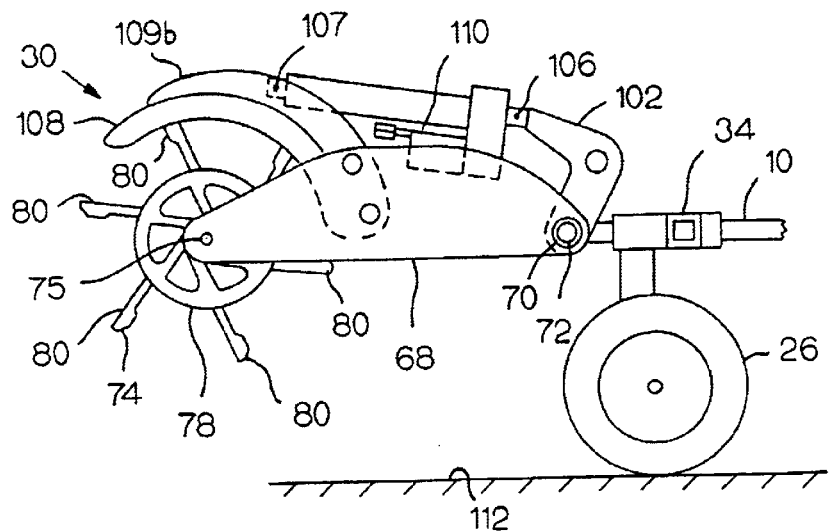
FIG. 3 is a side view of the aerator attachment.
Figure 4:
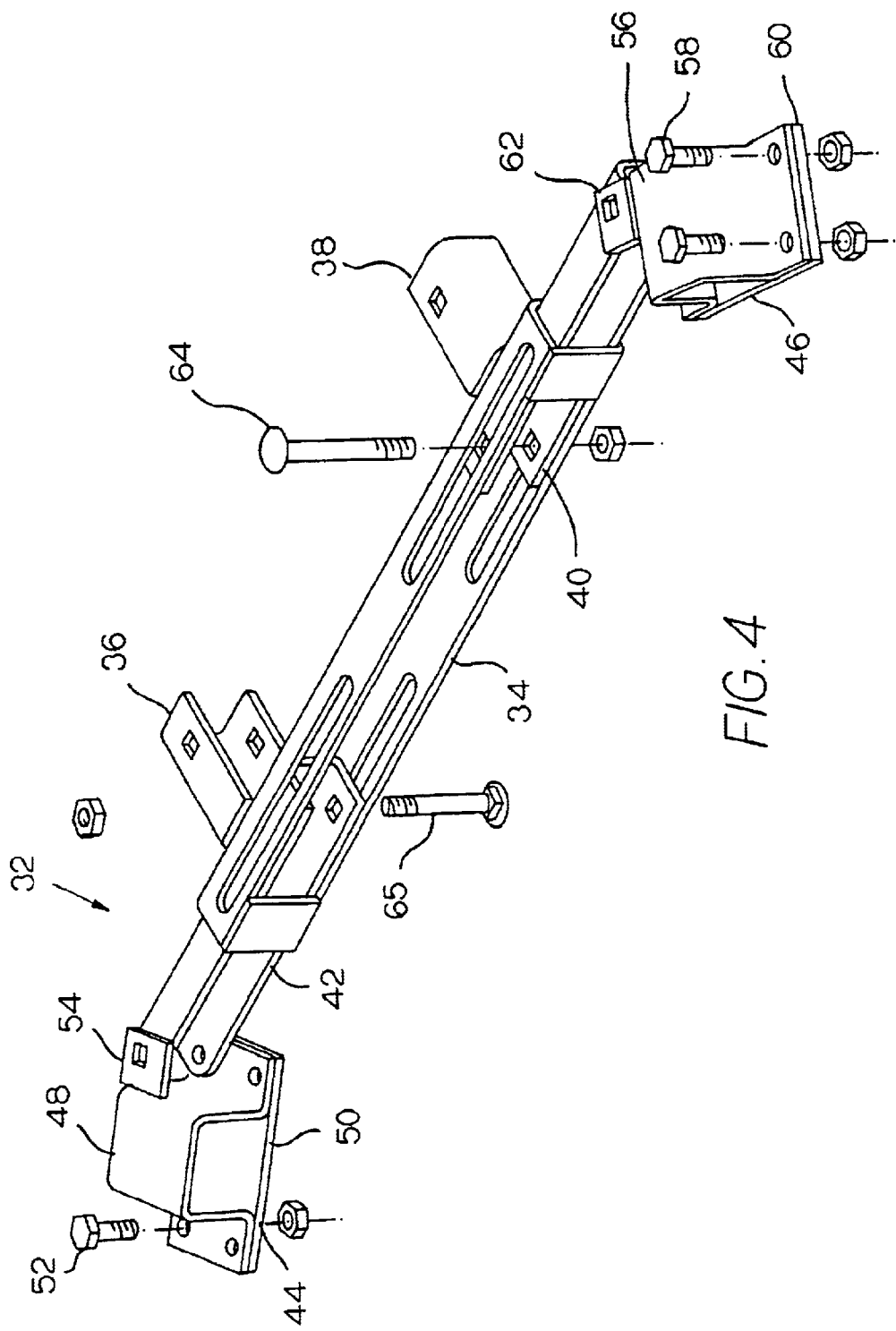
FIG. 4 is a perspective view of the hitching apparatus.

Referring to FIGS. 2 and 3, aerator apparatus 30 comprises a frame having a pair of elongated spaced, parallel side plates 66 and 68. A lateral tube 69 has its ends attached to the two side plates. An axle tube 70 has a pair of short tubes 92 and 94 telescopically mounted in support members 36 and 38, and locked in place by threaded fastener means 96 and 98 so that axle tube 70 is rigidly connected to support 34. An axle 72 is welded to the two side plates, and rotatably mounted in axle tube 70 so that axle 72 can pivot with the side plates about a horizontal axis.

An aerator drum assembly 74 is rotatably mounted on axle 75. Axle 75 has its ends attached to the two side plates, and pivots with the side plates with axle 72. Axle 75 is parallel to axle 72.

Figure 5:
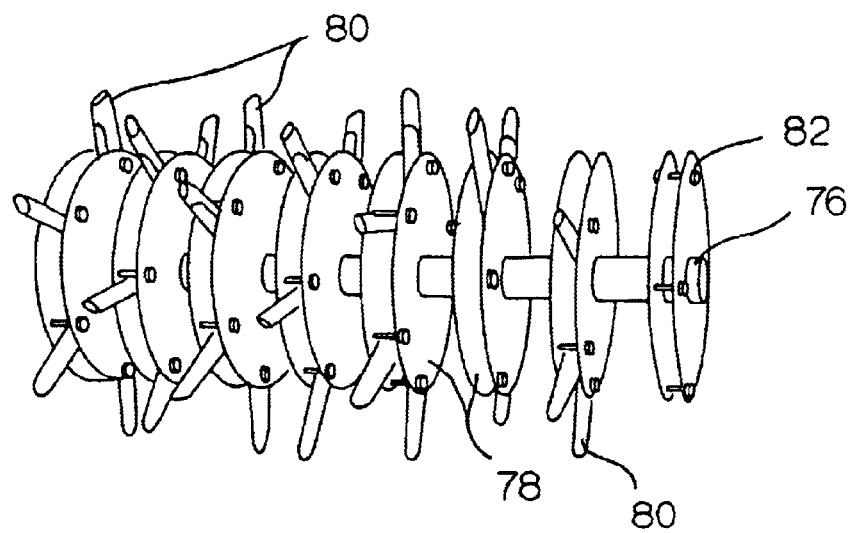
FIG. 5 is a view of the aerator drum separated from the aerator frame.

Referring to FIG. 5, the aerator drum assembly has a tubular sleeve 76 that is rotatably mounted on axle 75. Eight pairs of parallel, circular, prong-supporting plates 78 are welded on sleeve 76. Each pair of plates 78 supports six tubular tines 80 which extend from the sleeve at a 90° angle with respect to sleeve 76. Fastener means 82 clamp the tines between each pair of plates. Each tine has a pointed end that penetrates the ground as the aerator drum is being rotated. The tine forms a plug of soil (not shown), that advances into the tine and then drops to the ground.

Referring to FIGS. 2 and 3, a pair of spaced, upright parallel arms 100 and 102 is welded to the mid-section of tube 70. A hydraulic actuator 104 has a cylinder end 105 connected by a pin 106 to arms 100 and 102 so that the cylinder end of the actuator is pivotally connected with respect to axle tube 70.

The piston end of the actuator is pivotally connected by a pivot pin 107 to side plates 109*a* and 109*b*, on hood 108 on top of the aerator drum.

Hydraulic actuator 104 is moved between extended and retracted positions by a motor 110, which in turn is controlled by a remote control means 111 on the lawnmower. The arrangement is such that the piston rod is extended in an initial stroke to swing the aerator drum down toward ground level 112. The tines then penetrate the ground and resist further vertical penetration. However, the actuator advances the piston rod further causing the cylinder end of the actuator to swing upwardly, raising the weight of the mower resting on the caster wheels. This weight then is supported on the tines causing them to penetrate the ground to a depth depending upon the downward force applied to the aerator drum, and the compactness of the soil. The penetration depth is determined by the mower operator. The actuator has sufficient power to raise the caster wheels as the rotating tines penetrate the ground.

Figure 6:
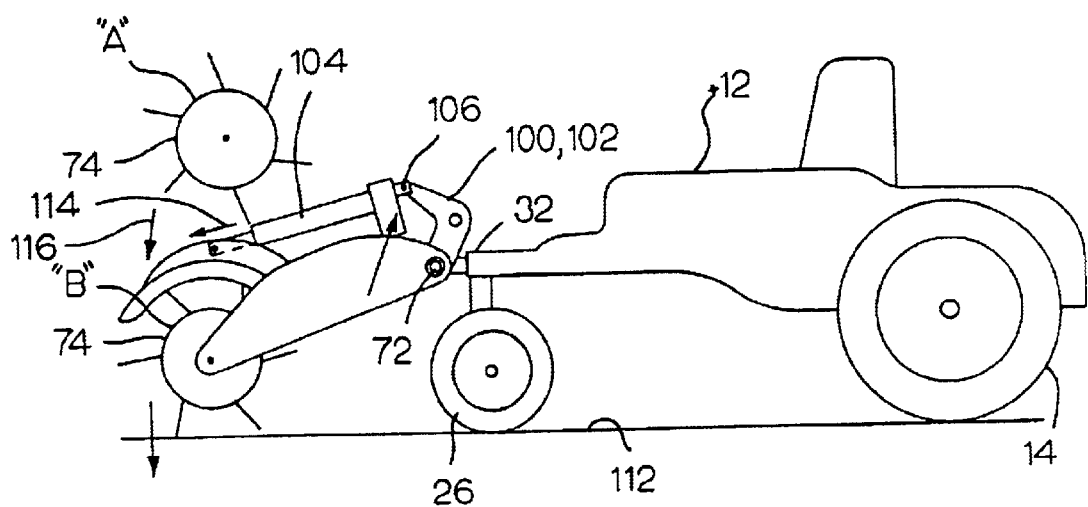
FIG. 6 is a diagram illustrating the relationship between the extension of the linear actuator and the lowering of the aerator drum.

FIG. 6 schematically illustrates the manner in which the aerator drum is lowered from its raised position illustrated in FIG. 3 toward a lower ground-engaging position. The body 12 of the lawn mower is rigidly attached to mounting structure 32 which in turn is rigidly attached to arms 100, 102. Thus these components can swing up and down about drive wheels 14 of the lawnmower.

When actuator 104 is initially energized, the piston rod is extended in the direction of arrow 114 causing the aerator drum to swing from its raised position at "A" to a lower position at "B" in which the tines begin to penetrate the ground. At this point, further penetration is resisted by the soil. To increase penetration, the piston rod is further extended causing the hydraulic cylinder to pivot around pivot pin 106 which, because of the resistance of the ground, causes the lawnmower body to rise with the cylinder in the direction of arrow 116. As the weight of the lawnmower is raised from caster wheels 24 and 26, a portion of this weight is distributed to the aerator tines causing them, with the forward motion of the lawnmower, to penetrate into the ground. The depth of the tines is determined by the operator of the lawnmower who controls the extension of the piston rod and the weight of the lawnmower distributed to the aerator drum.

The aerator drum is raised by retracting the piston into actuating cylinder 105.

Having described my invention, I claim:

1. A combination, comprising:

a wheeled lawn care apparatus having a forward end, and a frame;

a hitch structure having means for releasably connecting the hitch structure to the lawn care apparatus frame such that the hitch structure moves with and in advance of the lawn care apparatus when the lawn care apparatus is moving in a forward direction;

an aerator structure having a forward end, a rearward end, and ground-penetrating tines mounted on the forward end thereof, for engaging a ground surface;

axle means for pivotally connecting the rearward end of the aerator structure to the hitch structure;

a linear actuator having a first end and a second end;

first pivot means for pivotally connecting the first end of the linear actuator to the hitch structure, second pivot means for pivotally connecting the second end of the linear actuator to the aerator apparatus;

the linear actuator being supported on the aerator structure such that the first pivot means is disposed in a raised position above the second pivot means when the tines are disposed in a ground-penetrating position; and power means connected to the linear actuator and operative to pivotally raise the rearward end of the aerator structure upwardly with the forward end of the lawn care apparatus toward said raised position in which the weight of the lawn care apparatus biases the ground-penetrating tines toward a ground-penetrating position.

2. A combination as defined in claim 1, in which the linear actuator is a piston and cylinder actuator.

3. A combination as defined in claim 1, in which the hitch structure for attaching the aerator structure to the lawnmower frame comprises a lateral, elongated support member connected to the aerator structure, and clamping means carried on the elongated support member for gripping the lawnmower frame, such that the weight of the aerator structure is entirely carried on the lawnmower frame when the aerator drum is in a ground-clearing position.

4. A combination as defined in claim 1, in which the aerator structure includes a sleeve, and a plurality of radially extending tines mounted on the sleeve and rotatable therewith.

5. A combination as defined in claim 1, which the linear actuator is operative to pivot the rear end of the aerator structure from a lower ground-clearing position toward said raised position.

6. A combination as defined in claim 1, in which the motion of the lawn care apparatus in a forward direction causes the ground-penetrating tines to roll along a ground surface while penetrating the soil.

7. A combination as defined in claim 1, in which the hitch structure includes elongated telescopically engaged supports for adjusting the transverse length of the hitch structure connected to the lawn care frame.

8. An aerator attachment for a lawnmower having a forward end and a frame;

a hitch structure having a means for releasably connecting the hitch structure to a lawnmower frame such that the hitch structure moves with and in advance of the lawnmower when the lawnmower is moving in a forward direction;

an aerator structure having a forward end, a rearward end, and ground-penetrating tines mounted on the forward end thereof for engaging a ground surface;

axle means for pivotally connecting the rearward end of the aerator structure to the hitch structure;

a power-operated actuator mounted entirely on the aerator structure and pivotally connected to both the hitch structure and the rearward end of the aerator structure such that the rearward end of the aerator structure and the forward end of the lawnmower are disposed in a raised position when the tines are disposed in a ground-penetrating position; and power means connected to the actuator structure and operative to raise the rearward end of the aerator structure with the forward end of the lawnmower toward said raised position in which the weight of the lawnmower biases the ground-penetrating tines toward a ground-penetrating position.

9. A combination as defined in claim 8, which the actuator is operative to pivot the forward end of the aerator structure from a ground-engaging position toward a raised position above the ground.

10. A combination as defined in claim 8, in which the motion of the lawnmower in a forward direction causes the ground-penetrating tines to roll along a ground surface while penetrating the ground surface.

\* \* \* \* \*